(12) United States Patent
Lehnert

(10) Patent No.: US 7,370,032 B2
(45) Date of Patent: May 6, 2008

(54) DATA GATHERING

(75) Inventor: Bernd R. Lehnert, Neustadt (DE)

(73) Assignee: SAP AG, Walldorf (DE)

( * ) Notice: Subject to any disclaimer, the term of this patent is extended or adjusted under 35 U.S.C. 154(b) by 789 days.

(21) Appl. No.: 10/134,551

(22) Filed: Apr. 30, 2002

(65) Prior Publication Data

US 2003/0204495 A1    Oct. 30, 2003

(51) Int. Cl.
*G06F 7/00* (2006.01)
(52) U.S. Cl. .............................. 707/3; 707/102; 707/1
(58) Field of Classification Search ..................... None
See application file for complete search history.

(56) References Cited

U.S. PATENT DOCUMENTS

| | | | |
|---|---|---|---|
| 4,503,499 A | 3/1985 | Mason et al. | 718/101 |
| 4,751,740 A | 6/1988 | Wright | 382/180 |
| 4,905,080 A | 2/1990 | Watanabe et al. | |
| 4,970,665 A | 11/1990 | Doi et al. | 715/523 |
| 5,173,853 A | 12/1992 | Kelly et al. | 715/530 |
| 5,323,312 A | 6/1994 | Saito et al. | 715/513 |
| 5,379,213 A | 1/1995 | Derks | |
| 5,438,657 A | 8/1995 | Nakatani | 715/506 |
| 5,570,415 A | 10/1996 | Stretton et al. | |
| 5,632,002 A | 5/1997 | Hashimoto et al. | 704/231 |
| 5,704,029 A | 12/1997 | Wright, Jr. | |
| 5,857,201 A | 1/1999 | Wright, Jr. | |
| 5,991,595 A | 11/1999 | Romano et al. | |
| 5,999,908 A | 12/1999 | Abelow | |
| 6,070,143 A | 5/2000 | Barney et al. | |
| 6,151,707 A | 11/2000 | Hecksel et al. | |
| 6,181,910 B1 | 1/2001 | Jerrold-Jones et al. | |
| 6,209,004 B1 | 3/2001 | Taylor | 715/500 |
| 6,233,564 B1 * | 5/2001 | Schulze, Jr. | 705/14 |
| 6,250,930 B1 | 6/2001 | Mintz | 434/323 |
| 6,256,399 B1 | 7/2001 | Poor | |

(Continued)

FOREIGN PATENT DOCUMENTS

EP    1041801    10/2000

(Continued)

OTHER PUBLICATIONS

Lisa Chiranky, Mixing Web sites and call centers: Can this marriage really work? Pub. Jun. 1997, LookSmart Article.

(Continued)

*Primary Examiner*—Charles Rones
*Assistant Examiner*—Belix M Ortiz
(74) *Attorney, Agent, or Firm*—Fish & Richardson P.C.

(57) ABSTRACT

A method for gathering data may include receiving query information in a first format related to a query, identifying a format-independent portion of the query information and a format-dependent portion of the query information, and translating the format-dependent portion of the query data for rendition in a second format. A computer program product may include instructions to cause a processor to identify a first platform that a responder intends to use to respond to a first query in a data gathering tool, format the first query for rendition at the first platform, identify a second platform that the responder intends to use to respond to a second query in the data gathering tool, and format the second query for rendition at the second platform. The computer program product may be tangibly stored on machine readable media.

32 Claims, 5 Drawing Sheets

U.S. PATENT DOCUMENTS

| | | |
|---|---|---|
| 6,298,347 B1 | 10/2001 | Wesley |
| 6,308,201 B1 | 10/2001 | Pivovar et al. |
| 6,324,542 B1 | 11/2001 | Wright, Jr. et al. |
| 6,374,245 B1 | 4/2002 | Park |
| 6,557,013 B1 | 4/2003 | Ziff et al. |
| 6,564,207 B1 | 5/2003 | Abdoh |
| 6,826,540 B1 | 11/2004 | Plantec et al. |
| 6,865,578 B2 | 3/2005 | Hays |
| 7,206,746 B1 | 4/2007 | McIntosh |
| 2001/0032107 A1 | 10/2001 | Iwata et al. |
| 2002/0007303 A1 | 1/2002 | Brookler et al. |
| 2002/0023093 A1 | 2/2002 | Ziff et al. |
| 2002/0023230 A1 | 2/2002 | Bolnick et al. |
| 2002/0026459 A1 | 2/2002 | Fernandez |
| 2002/0032591 A1 | 3/2002 | Mahaffy et al. |
| 2002/0035474 A1 | 3/2002 | Alpdemir |
| 2002/0120491 A1 | 8/2002 | Nelson |
| 2003/0154085 A1* | 8/2003 | Kelley ........................ 704/275 |
| 2003/0154129 A1 | 8/2003 | Goff |
| 2003/0200161 A1 | 10/2003 | Bayer et al. |
| 2004/0148332 A1 | 7/2004 | Parolkar et al. ............ 709/200 |
| 2004/0153368 A1 | 8/2004 | Freishtat et al. .............. 705/26 |
| 2004/0199460 A1 | 10/2004 | Barash ........................ 705/38 |

FOREIGN PATENT DOCUMENTS

| | | |
|---|---|---|
| WO | 98/43181 | 10/1998 |

OTHER PUBLICATIONS

Office Action issued in U.S. Appl. No. 10/157,864, filed Aug. 9, 2007, 20 pages.

http://web.archive.org/web/20011222025251/commonknowledge.com/ivrsurveys.html—"Surveys at The Touch Of A Button," Dec. 22, 2001, retrieved from the Internet on Jan. 5, 2004, 3 pages.

* cited by examiner

DATA GATHERING

BACKGROUND

This disclosure relates to gathering data.

Many surveys, questionnaires, forms, and other data gathering tools have a format for gathering data using a single particular platform. For example, questionnaires that include both questions and potential replies can be drafted using word processing programs, printed on paper, and distributed to responders. Once a responder has completed the questionnaire, the responses can be converted into an electronic format using optical character recognition software. Likewise, surveys can be created in HTTP format and rendered on a computer screen using a Web browser.

SUMMARY

In one general aspect, a method for gathering data may include receiving query information related to a query, identifying a format-independent portion of the query information and a format-dependent portion of the query information, and translating the format-dependent portion of the query data for rendition in a second format. The received query information is in a first format.

Implementations may include one or more of the following features. For example, the query information may be split into the format-independent portion and the format-dependent portion. The format-independent portion can be stored separately from the format-dependent portion. The format-independent portion may be a response, such as, for example, a default response, to the query.

Translating the format-dependent portion may include translating a text portion of the query data into a second language for rendition in the second language, or transforming the format of the query for rendition on a second platform. Transforming the format of the query may include transforming the format of the query for a voice rendition, a visual rendition on a computer display, or a rendition on paper. The format-independent portion and the translated format-dependent portion may be transmitted to a server for rendition of the query.

Additional query information related to a second query may be received, and a data gathering tool may be formed from both queries. The data gathering tool may be a survey used to gauge an opinion of a customer. A format-independent portion and a format-dependent portion of the additional query information may be identified, and the format-dependent portion may be translated for rendition in another format. The format-independent portion and the translated format-dependent portion of the first query may be transmitted to a first platform and the format-independent portion and the format-dependent portion of the second query may be transmitted to a second platform.

The format-independent portion of the query information may be stored separately from the format-dependent portion. Responses to the query may be stored in the format-independent portion.

In another general aspect, a computer program product may include instructions to cause a processor to identify a first platform that a responder intends to use to respond to a first query in a data gathering tool, format the first query for rendition at the first platform, identify a second platform that the responder intends to use to respond to a second query in the data gathering tool, and format the second query for rendition at the second platform. The computer program product is tangibly stored on machine readable media.

Implementations may include one or more of the following features. For example, the product may also include instructions to identify a format-independent portion and a format-dependent portion of a query, and to translate the format-dependent portion for rendition at a platform.

The product may also include instructions to receive query information related the queries. The query information may independently define the first query. In particular, the query information may independently define the text, the layout, or the operation of the first query.

The product may also include instructions to identify a text portion of the first query and translate the text portion into another language, or to select display characteristics of the query for use in formatting the query for rendition. A query may request one response or a text or a field response. A query may specify rendition in a radio button, a check box, a drop down, or a yes/no button. The queries may be part of a survey to gauge an opinion of a customer.

Advantages may include one or more of the following. A data gathering tool that operates using more than one platform and/or gathers variable sets of data regarding variable subjects is able to gather and analyze data even in dynamic environments where platforms, and the pertinence of subjects, data, and analyses, change rapidly and from user to user.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
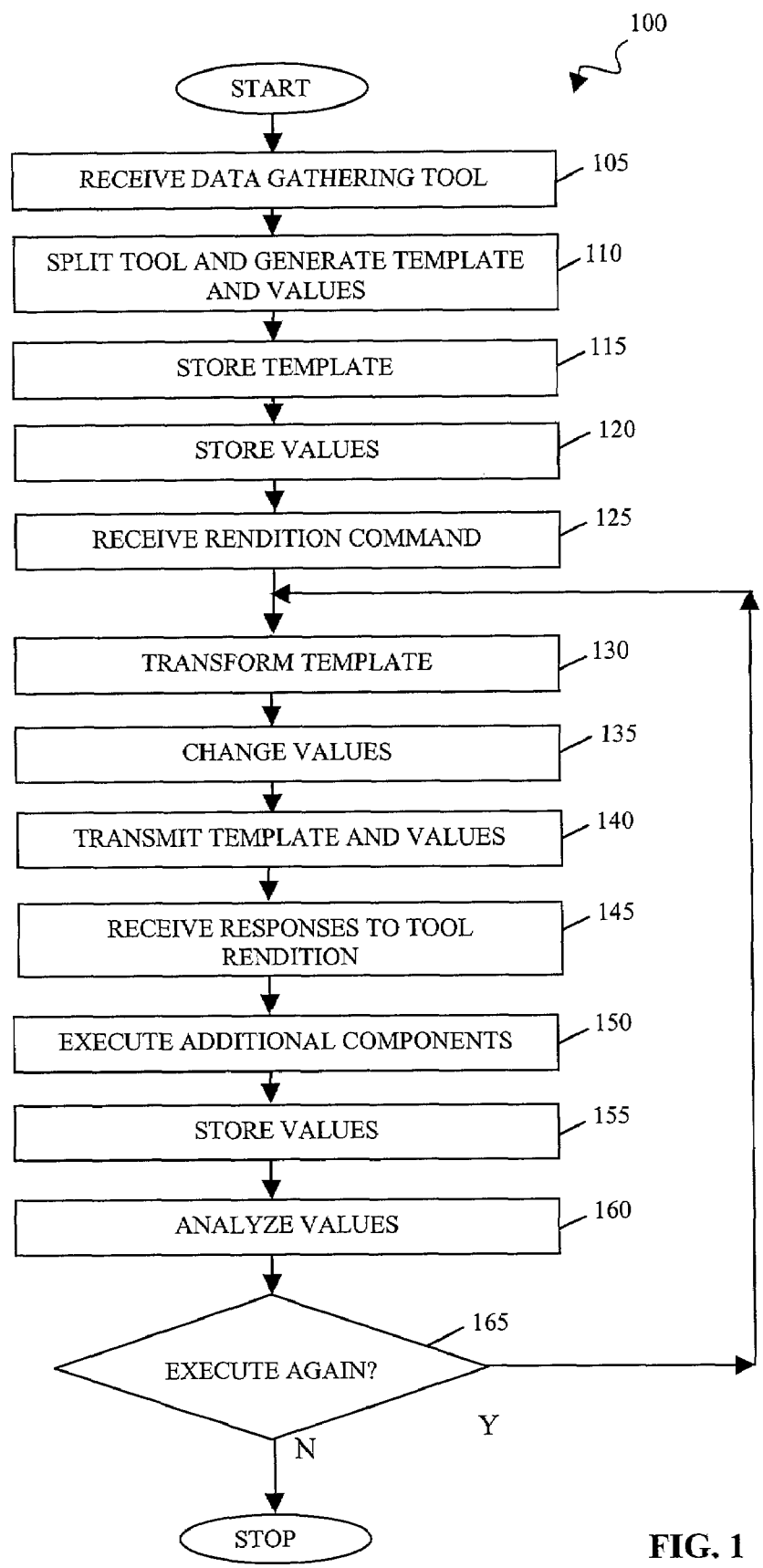
FIG. 1 is a flow chart of a process for gathering data.

Referring to FIG. 1, a process 100 for gathering data begins with the reception of an electronically-accessible data gathering tool such as an electronic query form by a system for gathering data (step 105). The tool can be received as a completed construction that includes a collection of predefined queries. Alternatively, the tool can be modularly assembled by a user, as discussed further below. The data gathering tool may include, for example, queries, potential and default responses to the queries, operating instructions for executing the queries, and display instructions for displaying the queries and responses. The data gathering tool may be represented, for example, in an extensible markup language (XML) file.

Once the system has received the data gathering tool, the system divides the tool into a data gathering tool template and data gathering tool values (step 110). The system can divide the tool by identifying the structures of the tool template and the tool values. The data gathering tool values initially include default responses to the queries in the data gathering tool. The data gathering tool template includes the remainder of the data gathering tool, including query text, layout and presentation parameters, and operations. The system stores the template (step 115) and the values (step 120) separately.

Dividing the data gathering tool simplifies translation of the data gathering tool values into other human languages or computer formats. In particular, the data gathering tool values are format-independent (for example, a logic high or an integer value), whereas the data gathering template may be language-dependent or platform-dependent (for example, ASCII query text may ask if the responder were satisfied with a product or may ask the responder to rank the responder's satisfaction with the product on an integer scale, while a format parameter may specify relative font sizes). By separating data gathering tool values from the data gathering tool template, the portion of the data gathering tool that is translated into other languages or formats is reduced.

At some point in time, the system can receive a rendition command indicating that rendition of the data gathering tool is requested (step 125). The rendition command also identifies the platform where the data gathering tool is to be executed. Suitable platforms include cellular phones, processor systems like personal computers, software applications such as customer resource management (CRM) applications running on network systems, websites, personal digital assistants (PDAs), and email. Once the rendition platform has been identified, the system transforms the data gathering tool template (step 130) and changes the data gathering tool values (step 135) for rendition on the platform, and transmits the transformed template and the changed values to a responder's platform (step 140).

A responder's platform integrates the data gathering tool template and the data gathering tool values into a single data gathering tool. The tool is rendered by the responder's platform, which, in turn, receives responses to the queries of the data gathering tool and returns them to the system. The responder's platform can render the data gathering tool by, for example, printing the queries in the data gathering tool, displaying the queries in the data gathering tool on an electronic display, or vocalizing the queries in the data gathering tool over a telephone line. The system receives the responses (step 145), and may additionally call other functions, such as data analysis applications, using the received data (step 150). The responses received during rendition of the data gathering tool are stored as the data gathering tool values (step 155). The responses may, for example, overwrite the default data gathering tool values or be stored subsequently to the default data gathering tool values so that a record of change in the responses is maintained. The responses may be stored in a database.

Rendition of the data gathering tool may be followed by analysis of the received responses (step 160). Either the platform or the system may perform an analysis using rules or other criteria included in the data gathering tool.

For any of a number of reasons, the platform rendering the data gathering tool may not complete data gathering. For example, a responder may lack the time needed to respond to every query in a data gathering tool, appropriate responses may not yet be available, or data gathering may be interrupted. In view of this, a decision is made as to whether the data gathering tool is to be rendered again (step 165). This decision can be based on, for example, the receipt of another rendition command that identifies a different platform. If it is decided that the data gathering tool is to again be executed, then the process 100 returns to having the system transform the data gathering tool template (step 130) and change the data gathering tool values (step 135) for rendition on the new platform.

A survey is class of data gathering tool that can be sent to customers or potential customers to determine their opinion about a product or a product offering. For example, a survey may be sent to customers to measure customer satisfaction with a new or potential product version or to receive a trainee evaluation of the quality or content of a training session. In these example scenarios, the customer responses are used for planning, designing, and improving products.

Another class of surveys may be sent to customers to gauge their interest in a product offering. This class of surveys is used in lead evaluation to ascertain the value of a sales opportunity.

Figure 2:
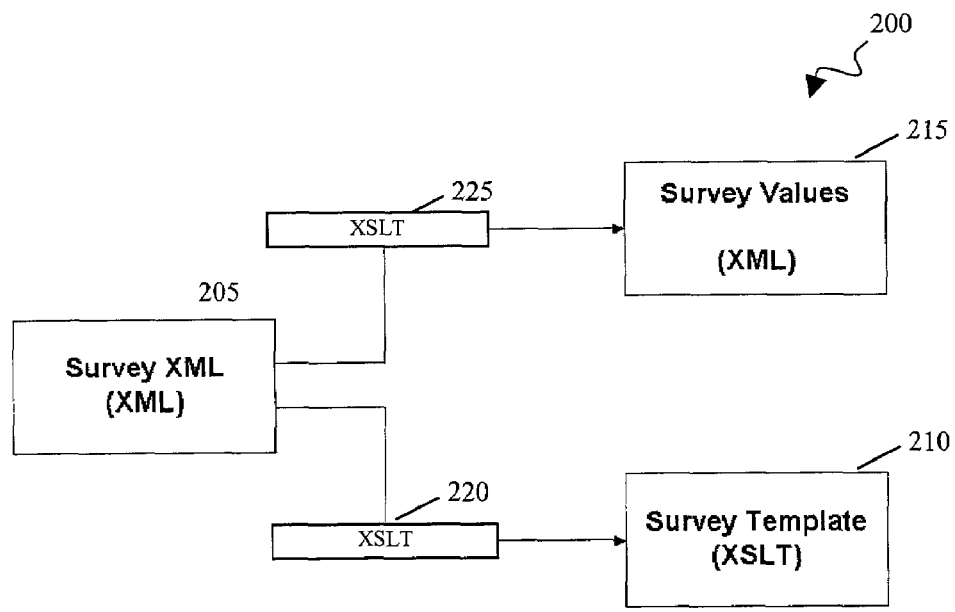
FIG. 2 is a schematic representation of a method for dividing a survey.

Referring to FIG. 2, a process 200 divides a survey 205 into a survey template 210 and survey values 215. Survey 205 is represented in a XML format. Survey 205 is transformed using a first extensible markup language transformation (XSLT) 220 to provide a XSLT format survey template 210. Survey 205 is transformed using a second XSLT 225 to provide survey values 215 in a XML format.

Figure 3:
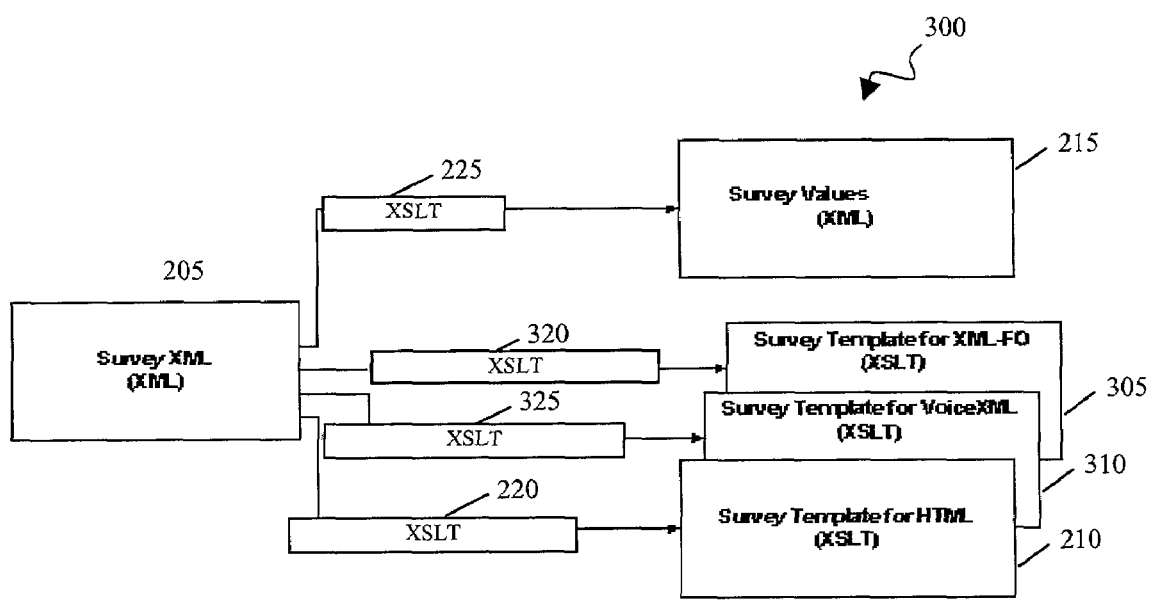
FIG. 3 is a schematic representation of a collection of methods for dividing a survey.

By dividing survey 205 into a survey template 210 and survey values 215, the translation of survey 205 into other human languages or computer formats is simplified. In particular, only the survey template portion 210 needs to be translated. For example, referring to FIG. 3, a process 300 may extract multiple survey templates 305, 310, and 315 from the survey 205 using XSLTs 320, 325, and 330 that are selected in accordance with a responder's platform. For example, survey 205 may be transformed using a first XSLT 325 to provide an XSLT format survey template 310 for voice platforms like cellular phones. Survey 205 may also be transformed using a second XSLT 320 to provide an XSLT format survey template 315 for, e.g., the creation of portable document format (PDF) surveys. Survey 205 may also be transformed into survey templates having other formats. For example, if the survey 205 is to be executed on a handheld device, the survey may be transformed into a website META language (WML) format. Independent of the transformation of the survey template, transform 225 may be used to extract survey values 215 from survey 205. By separating survey values from survey templates, the portion of the survey that is translated into other languages or formats is reduced.

Figure 4:
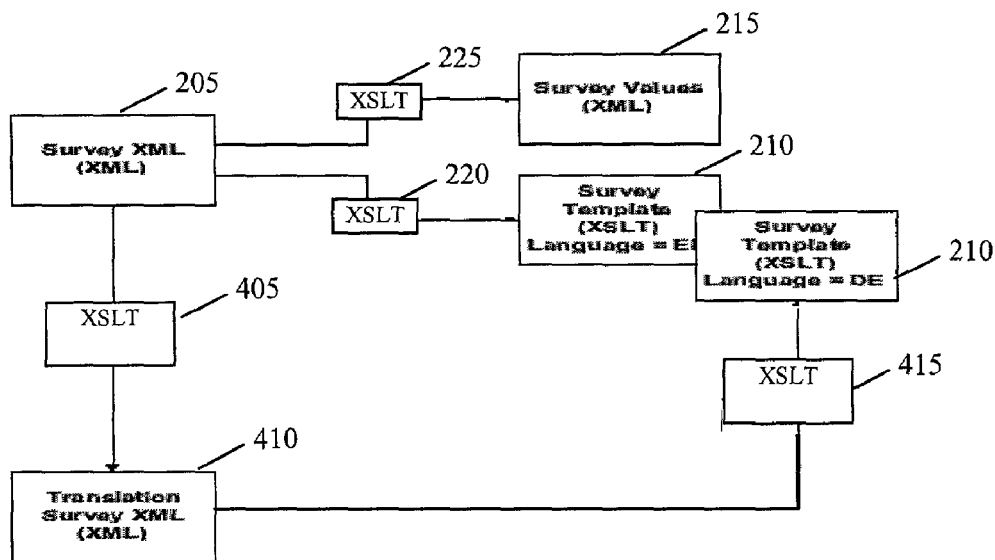
FIG. 4 is a schematic representation of a method for translating a survey.
Figure 5:
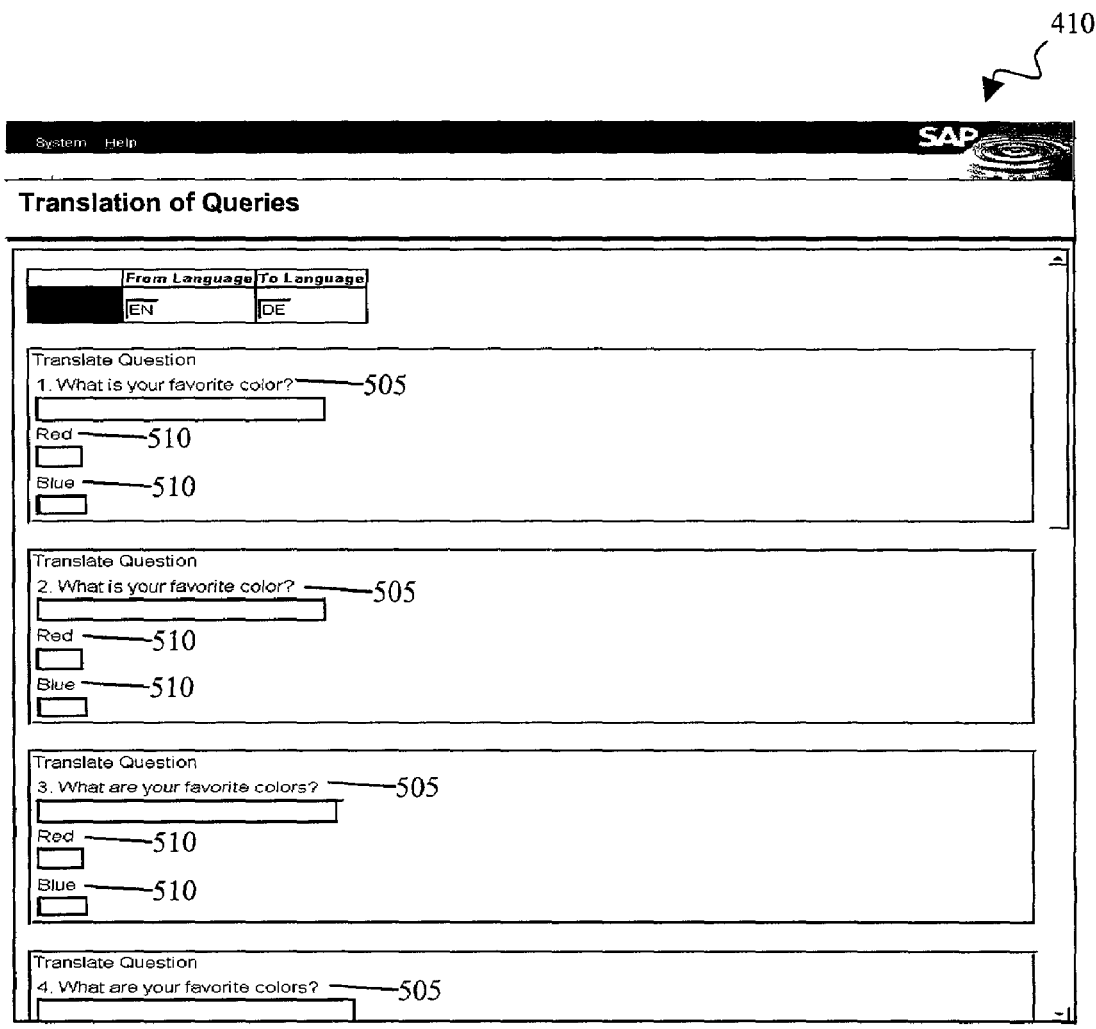
FIG. 5 is a screenshot of an example translation survey.

Referring to FIG. 4, a variety of survey templates 210 selected in accordance with a responder's language may also be extracted from survey 205. For example, an inquirer's or a responder's system may use a transformation 405 to extract text from survey 205 to generate a translation survey 410 in XML format. Referring also to FIG. 5, translation survey 410 includes extracted query texts 505 and response text labels 510.

Survey 410 is translated using, e.g., a Web browser or an embedded HTML control. After translation, translation survey 410 is then activated when a system calls a second transformation 415 which generates a translated survey template 210. The translated survey template 210 can be linked or otherwise associated with survey 205.

Figure 6:
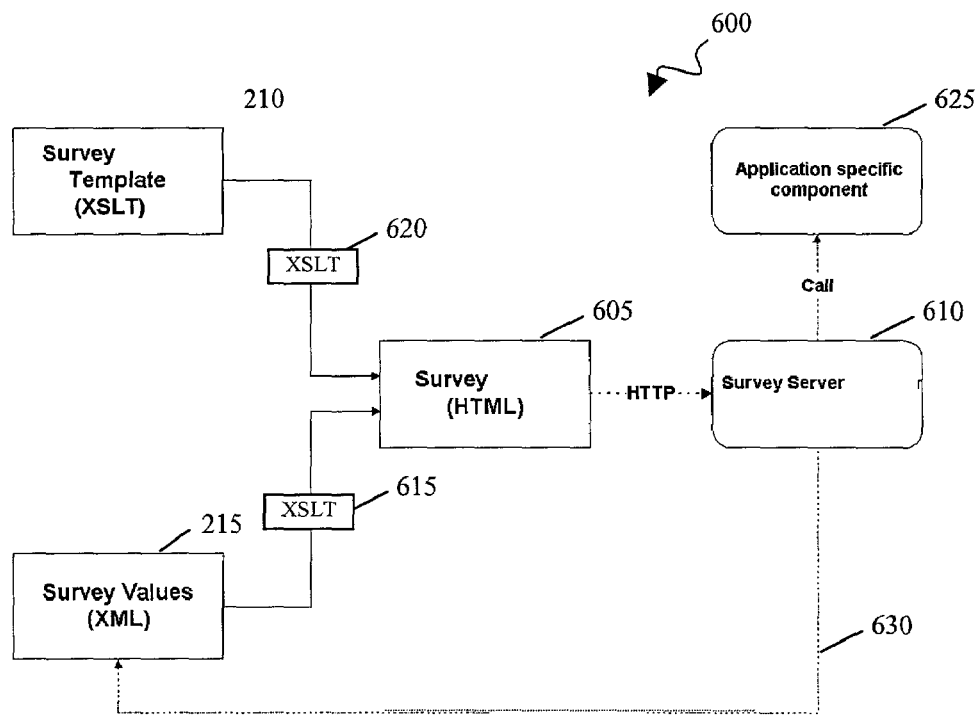
FIG. 6 is a schematic representation of a method for translating a survey for rendition.

Referring to FIG. 6, a process 600 uses survey template 210 and survey values 215 to produce a hypertext markup language (HTML) survey 605 that can be rendered on a responder's survey server platform 610. Survey template 210 is transformed using an XSLT 615 and survey values 215 are transformed using an XSLT 620 and integrated to provide an HTML survey 605. The responder's platform can transform survey template 210 and survey values 215 to provide HTML survey 605. In addition to queries and potential responses, HTML survey 605 may also include defined typographic styles using, for example, cascading style sheets (CSS).

HTML survey 605 is transmitted using hypertext transfer protocol (HTTP) to the responder's survey server platform 610 where it is rendered by, for example, a Web browser. Alternatively, HTML survey 605 is integrated into an HTML control within another application, such as a SAP™ CRM Online application. The other application may include an application specific component 605 such as, for example, a data analysis tool, that is also executed.

After rendition of HTML survey 605, responses by the customer or the potential customer may be returned 630 to the system that acts as the source of the survey using, e.g., HTTP. Once received, survey values 215 may be overwritten or updated to include the responses generated by rendition of HTML survey 605. Since responses are stored in the survey values 215, a responder can respond to an arbitrary number of queries using a first platform, have the results stored, and then later complete the survey and review the earlier responses using a second platform.

Likewise, since the format of the responses in survey values 215 is the same regardless of the language of survey template 210, responses from responders who speak different languages can easily be compared.

Figure 7:
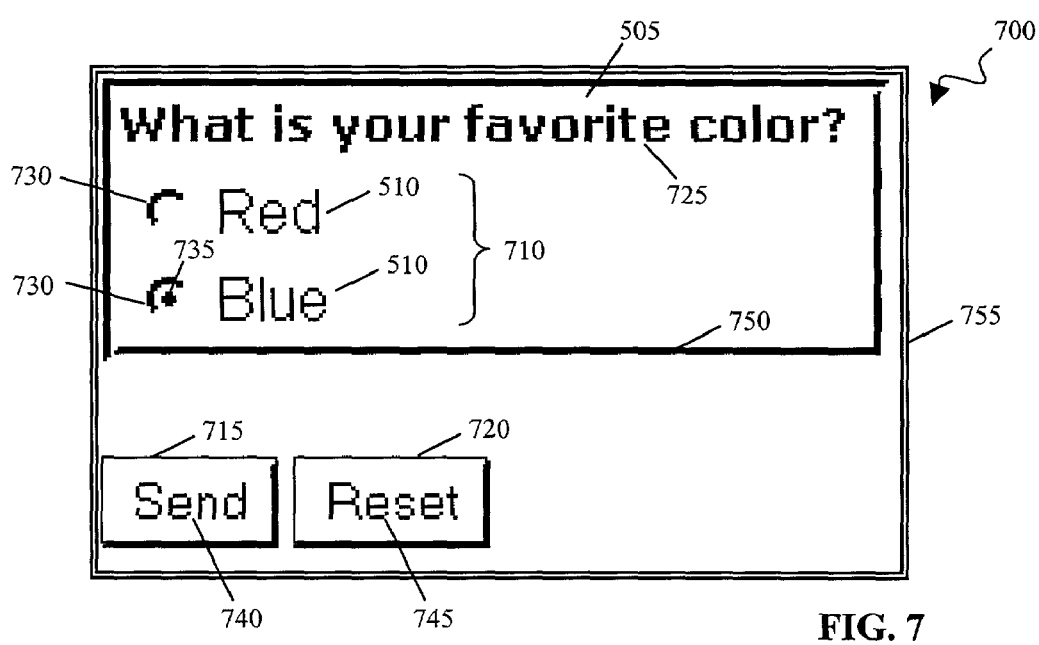
FIG. 7 is a diagram of a display of an example query.

Referring to FIG. 7, a query 700 in a data gathering tool includes a query text 505, a response input 710, a response submit input 715, and a response reset 720. Query text 505 has various display characteristics 725 including, for example, a font, a size, and a font style. Response input 710 includes a pair of input radio buttons 730 that are each labeled with a response text label 510. Response input 710 also includes a selection indicator 735 that indicates that a particular radio button 730 is the default response or has been selected by a responder. Response submit input 715 includes a text label 740 that identifies the function of response submit input 715 to a responder. Response reset 720 includes a text label 745 that identify the function of response reset 720 to a responder. Response submit input 715 and response reset 720 operate query 700. Query 700 may also include additional display features 750, 755, such as, for example, borders, shading, and colors. Query 700 can additionally include further inputs position, for example, beneath the submit and response buttons.

TABLE 1

| Type | Style | Description |
|---|---|---|
| SingleChoice | RadioButton | Only one response is requested, the options are represented by radio buttons |
| SingleChoice | Listbox | Only one response is requested, the options are represented in a listbox |
| MultipleChoice | Checkbox | Any number of responses are requested, the options are represented by checkboxes |
| MultipleChoice | Listbox | Any number of responses are requested, the options are represented in a listbox |
| YesNo | Checkbox | The requested response is Boolean, the options are represented in a checkbox |
| FillIn | Field | The requested response is an input field |
| FillIn | Text | The requested response is text |

Referring to Table 1, various types of queries may be included in a data gathering tool such as a survey. SingleChoice queries only request one response. MultipleChoice queries request any number of responses, up to and including every potential response. YesNo queries request a Boolean response. FillIn queries request user input.

TABLE 2

| Type | Style | Attributes | Meaning |
|---|---|---|---|
| FillIn | Field | @Size @MaxLength | Displayed field length field length |
| FillIn | Text | @Rows @Cols | Number of rows Number of columns |

Referring to Table 2, additional attributes may be used to identify the length and other size factors of FillIn queries.

TABLE 3

XML snippet defining query 700 of FIG. 7.
    Parameters:
1. Name of the query: QuestionId
2. Name of the answer: AnswerId
3. Type of the query: Type
4. Style of the query: Style
5. State of the answer: ReadOnly
    <Question QuestionId="color">
        <QuestionText>What is your favorite color?
        </QuestionText>
        <Answer AnswerId="a1" Type="SingleChoice" Style=
"Checkbox"
ReadOnly="false">
        <Item>
          <ItemText>Red</ItemText>
          <Value>red</Value>
        </Item>
        <Item>
          <ItemText>Blue</ItemText>
          <Value Selected="true">blue</Value>
        </Item>
    </Answer>
</Question>
<Event>
  <Button>
    <Submit Command="SUBMIT">Send</Submit>
    <Reset>Reset</Reset>
  </Button>
</Event>

Referring to Table 3, an illustrative XML snippet defining query 700 of FIG. 7 describes the text and the operation of query 700 independently of the description of other queries or a global description of the survey. Since query 700 is independently defined, a designer is able to modularly assemble a collection of queries to form a survey or other data gathering tool. This increases the flexibility of the data collection process. The type of data that is collected can be rapidly adapted to changing or local conditions and the pertinence of subjects, data, and analyses. An inquirer can also iteratively adapt a data gathering tool to particular or changing needs.

Furthermore, the structured format of the XML snippet defining query 700 facilitates separation of the survey values and survey template. In particular, since the format-independent response to query 700 is easy to identify within the XML snippet, logic for splitting the survey values the survey template is relatively easy to implement.

Figure 8:
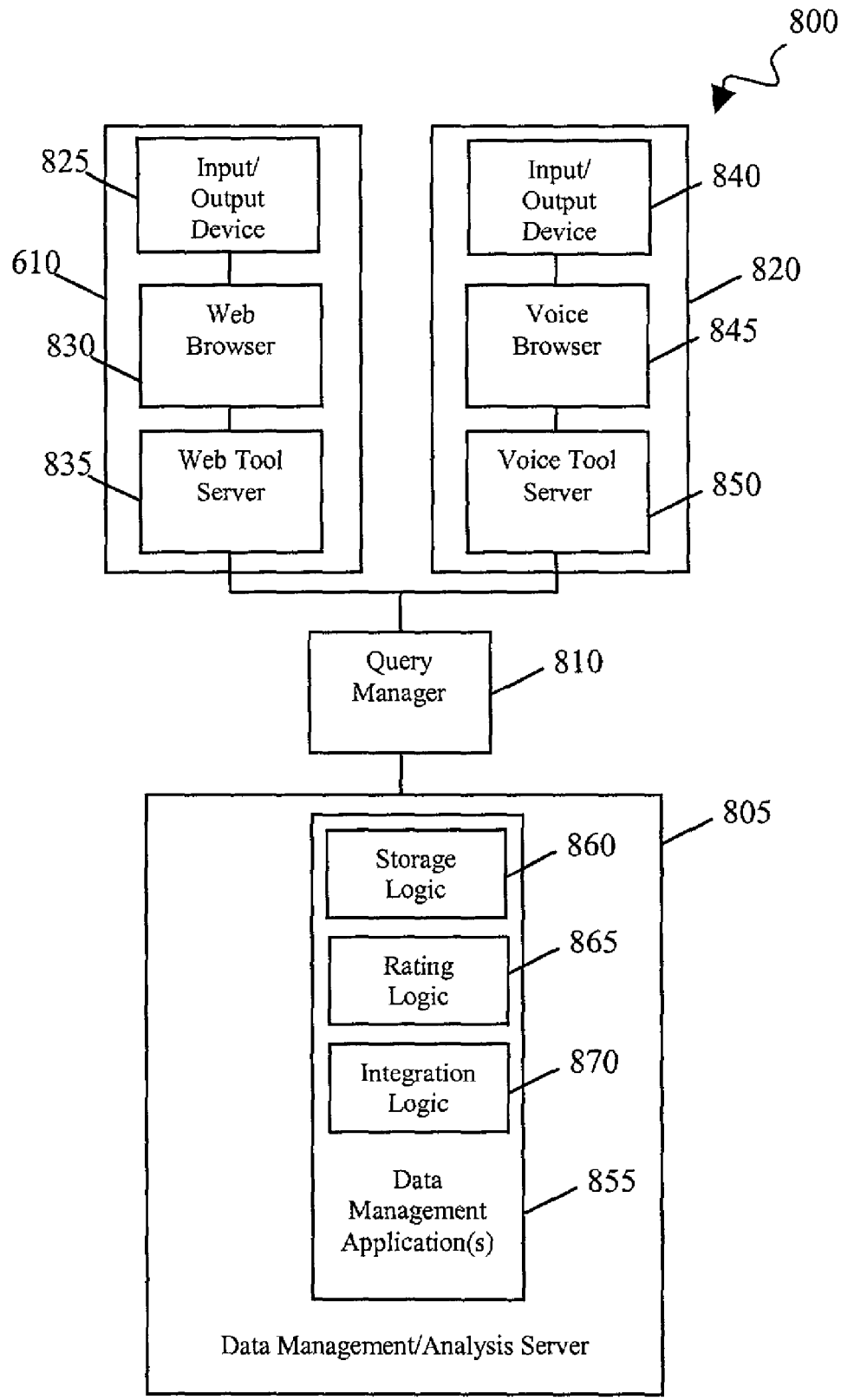
FIG. 8 is a block diagram of a system for gathering data.

Referring to FIG. 8, an example system 800 for gathering data includes a backend data management/analysis server 805, a query manager 810, a front end Web data gathering tool server 610, and a front end voice data gathering tool server 820. Web tool server 610 includes data input/output devices 825, a Web browser 830, and a Web server 835. Voice tool server 820 includes data input/output devices 840, a voice browser 830, and a voice server 835. Query manager 810 manages data exchange between tool servers 610, 820 and data management/analysis server 805.

Data management/analysis server 805 may be, for example, a central database system that includes a data management application 855. Data management application 855 includes storage logic 860 for storing and accessing data, rating logic 865 for evaluating data, and integration logic 870 for integrating with other applications. Data management application 855 may be a customer resource management (CRM) application such as SAP™ CRM 3.0.

In an example operation, a responder places a telephone call from a phone (i.e., an input/output device 840) on a public telephone network. The telephone call is redirected from the gateway to voice server 850. Voice server 850 creates a voice browser 845 and forwards the call to query manager 810. Query manager 810 identifies the responder using, for example, a password and authorizes data transactions with the incoming call. Query manager 810 also requests a relevant data gathering tool from data management/analysis server 805, and identifies that the responder intends to use voice browser 845 to respond.

Data management/analysis server 805 identifies a relevant data gathering tool using, for example, the identification provided by the responder, and splits and transforms the tool. Data management/analysis server 805 transmits the relevant data gathering tool values 215 through query manager 810 to voice survey server 850. Since the responder's platform is the telephone, data management/analysis server 805 also prepares and transmits a data gathering tool template for voice 210. Voice survey server 850 renders the voice template and values employing voice browser 845 to present the queries to the responder using a speaker (i.e., an input/output device 840).

The responder replies to the queries using, for example, a keypad or by speaking into a telephone microphone (i.e., input/output device 840). Spoken replies can be analyzed using voice recognition software. The replies are received by voice browser 845, which sends the responses to query manager 810. Query manager 810 forwards the responses, along with session information, to data management/analysis server 805. Data management/analysis server 805 stores the responses in data gathering tool values 215, as discussed above. Data management/analysis server 805 may also analyze or otherwise process the responses as appropriate. Data management/analysis server 805 may integrate the responses into other applications using integration logic 870. After the voice session is complete, voice server 850 ends the voice browser 845.

If the responder does not respond to every query in the data gathering tool, the responder can also log on to a website on Web tool server 835 using Web browser 830. Query manager 810 again identifies the responder and authorizes data transactions. Query manager 810 also requests the partially-completed data gathering tool from data management/analysis server 805, and identifies that the responder intends to use Web browser 830 to respond.

Data management/analysis server 805 identifies the partially-completed data gathering tool and splits and transforms the tool. Data management/analysis server 805 transmits the data gathering tool values 215 through query manager 810 to Web tool server 835. Since the responder's platform employs Web browser 830, data management/analysis server 805 also prepares and transmits a data gathering tool template for HTML 210. Web tool server 835 renders the HTML template and tool values to present the queries to the responder using Web browser 830 running on, for example, the responder's personal computer (i.e., input/output device 825).

The responder's replies are received by Web browser 830, which relays the responses to query manager 810. Query manager 810 forwards the responses, along with session information, to data management/analysis server 805. Data management/analysis server 805 stores the responses in data gathering tool values 215.

The systems and techniques can also be implemented in digital electronic circuitry, or in computer hardware, firmware, software, or in combinations of them. Systems can be implemented in a computer program product tangibly embodied in a machine-readable storage device for execution by a programmable processor; and method steps of the invention can be performed by a programmable processor executing a program of instructions to perform functions of the invention by operating on input data and generating output. The systems and techniques can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs ("application-specific integrated circuits").

To provide for interaction with a user, the systems and techniques can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of implementations have been described. Nevertheless, it will be understood that various modifications may be made. For example, data gathering tools with other formats such as standard generalized markup language (SGML) formats may be used.

Accordingly, other implementations are within the scope of the following claims.

What is claimed is:

1. A method, performed at least partially on a computer, for gathering data from a person based on responses to queries presented to the person, comprising:
   receiving, at a computer system, query information related to a query, the query information being in a first electronic format and including query text and one or more query response portions;
   identifying, using the computer system:
      the query text included in the received query information, and
      the one or more query response portions included in the received query information;
   storing, using the computer system, the identified query text included in the received query information;
   storing, using the computer system, the identified one or more query response portions included in the received query information;
   receiving, at the computer system, a request to render at least a part of the query information;
   accessing, at the computer system and based on the received request, the stored identified query text;
   translating, using the computer system and based on the accessed query text, the query text included in the received query information for rendition in a second electronic format;
   enabling rendition of the translated query information in the second electronic format;
   receiving, at the computer system, responses to the translated query text included in the received query information; and
   storing, using the computer system, the received responses to the translated query text as one or more query responses.

2. The method of claim 1, wherein identifying the query text and the one or more query response portions comprises splitting the query information into the query text and the one or more query response portions.

3. The method of claim 2, wherein splitting the query information into the query text and the one or more query response portions comprises storing the one or more query response portions separately from the query text.

4. The method of claim 1, wherein identifying the query text comprises identifying a response to the query.

5. The method of claim 4, wherein the response is a default response.

6. The method of claim 1, wherein translating the query text included in the received query information for rendition in the second electronic format comprises translating a text portion of the query data into a second language for rendition in the second language.

7. The method of claim 1, wherein translating the query text included in the received query information for rendition in the second electronic format comprises transforming the format of the query for rendition on a second platform.

8. The method of claim 7, wherein transforming the format of the query for rendition on the second platform comprises transforming the format of the query for a voice rendition.

9. The method of claim 7, wherein transforming the format of the query for rendition on the second platform comprises transforming the format of the query for a visual rendition on a computer display.

10. The method of claim 7, wherein transforming the format of the query for rendition on the second platform comprises transforming the format of the query for printing on paper.

11. The method of claim 1, further comprising transmitting the query text and the translated query text to a server for rendition of the query.

12. The method of claim 1, further comprising:
    receiving, at the computer system, second query information related to a second query.

13. The method of claim 11 further comprising forming, using the computer system and based on receiving the second query information, a survey to gauge an opinion of a customer.

14. The method of claim 11, further comprising:
    identifying, using the computer system:
       the query text included in the received second query information, and
       the one or more query response portions included in the received second query information;
    storing, using the computer system, the identified query text included in the received second query information;
    storing, using the computer system, the identified one or more query response portions included in the received second query information;
    receiving, at the computer system, a request to render at least a part of the second query information;
    accessing, at the computer system and based on the received request, the stored identified query text included in the received second query information; and
    translating, using the computer system and based on the accessed query text, the query text included in the received second query information for rendition in a third format.

15. The method of claim 14, further comprising:
    transmitting, using the computer system, the identified one or more query response portions included in the received query information and the translated query text included in the received query information to a first platform; and
    transmitting, using the computer system, the query text included in the received second query information.

16. The method of claim 1, wherein the first electronic format comprises an XML format.

17. A computer program product, tangibly stored on machine readable media, for gathering data from a person based on responses to queries presented to the person, the product comprising instructions to cause a processor to:
    receive, at a computer system, query information related to a query, the query information being in a first electronic format and including a query text and one or more query response portions;
    identify, using the computer system:
       the query text included in the received query information, and
       the one or more query response portions included in the received query information;
    store, using the computer system, the identified query text included in the received query information;
    store, using the computer system, the identified one or more query response portions included in the received query information;
    receive, at the computer system and from a responder, a request to enable rendering of at least a part of the query information;
    access, at the computer system and based on the received request, the stored identified query text;
    identify, using the computer system, a first platform that the responder intends to use to respond to a first query in the received query information;

format, using the computer system and based on the accessed query text, the first query for rendition at the first platform based on identification of the first platform;

identify, using the computer system, a second platform that the responder intends to use to respond to a second query in the received query information; and format, using the computer system and based on the accessed query text, the second query for rendition at the second platform based on identification of the second platform, wherein the first platform is different than the second platform.

18. The product of claim 17, wherein the product further comprises instructions to:

translate, using the computer system and based on the accessed query text, the query text included in the received first query for rendition at the first platform.

19. The product of claim 17, wherein the product further comprises instructions to receive first query information related the first query and second query information related the second query.

20. The product of claim 17, wherein the first query information independently defines the first query.

21. The product of claim 20, wherein the first query information independently defines the text of the first query.

22. The product of claim 20, wherein the first query information independently defines the layout of the first query.

23. The product of claim 20, wherein the first query information independently defines the operation of the first query.

24. The product of claim 17, wherein the product further comprises instructions to select display characteristics of the first query to format the first query for rendition.

25. The product of claim 17, wherein the first query requests one response.

26. The product of claim 17, wherein the first query requests a text response.

27. The product of claim 17, wherein the first query specifies rendition in a radio button.

28. The product of claim 17, wherein the first query and the second query are part of a survey to gauge an opinion of a customer.

29. The product of claim 17, wherein the second platform comprises a paper platform.

30. The method of claim 1 wherein storing the received responses to the translated query text as one or more query responses comprises storing the received responses to the translated query text with the stored identified one or more query response portions included in the received query information.

31. The method of claim 30 wherein storing the received responses to the translated query text with the stored identified one or more query response portions included in the received query information comprises overwriting some or all of the stored identified one or more query response portions included in the received query information.

32. The method of claim 30 wherein storing the received responses to the translated query text with the stored identified one or more query response portions included in the received query information comprises storing the received responses to the translated query text subsequent to the stored identified one or more query response portions included in the received query information.

\* \* \* \* \*